Dec. 17, 1929.  T. K. TIFFANY  1,740,433
INCUBATOR
Filed May 20, 1925  2 Sheets-Sheet 1
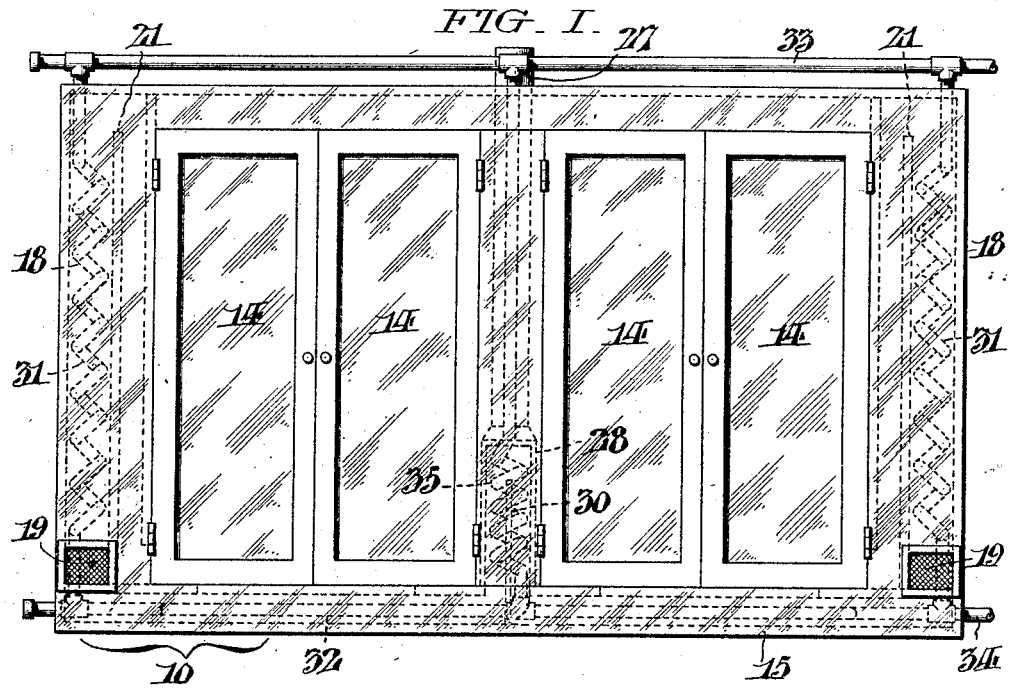
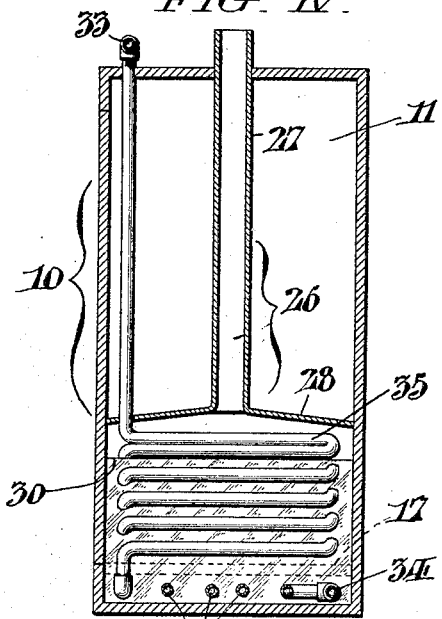
WITNESSES
INVENTOR:
Tolbert K. Tiffany,
BY Fraley & Paul
ATTORNEYS.

Dec. 17, 1929.  T. K. TIFFANY  1,740,433
INCUBATOR
Filed May 20, 1925  2 Sheets-Sheet 2
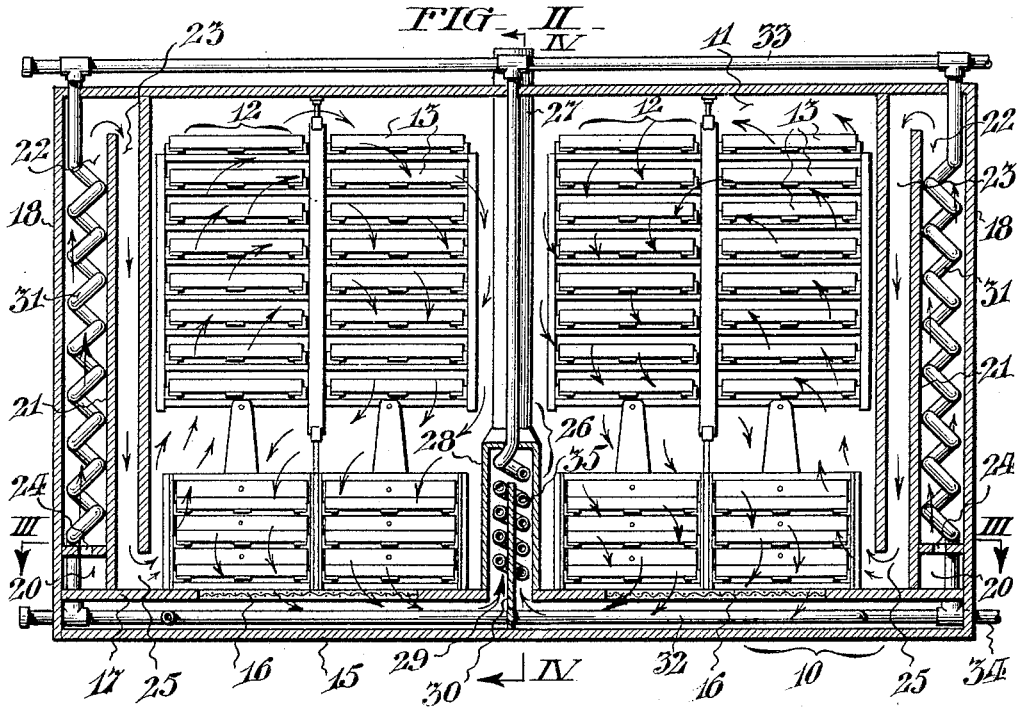
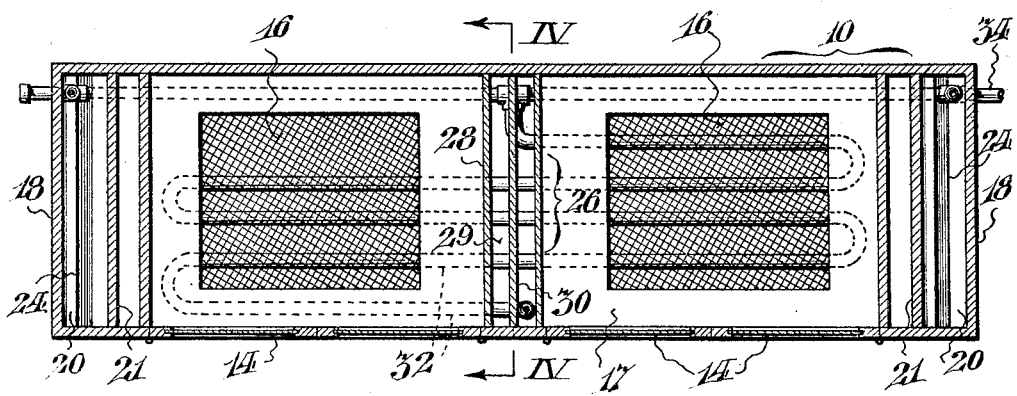

Patented Dec. 17, 1929

1,740,433

UNITED STATES PATENT OFFICE

TOLBERT K. TIFFANY, OF TRENTON, NEW JERSEY, ASSIGNOR TO JAMES H. BELL, OF PHILADELPHIA, PENNSYLVANIA

INCUBATOR

Application filed May 20, 1925. Serial No. 31,509.

This invention relates generally to incubators such as used in the poultry industry, and more particularly to those of the upright or cabinet type.

On account of the considerable vertical depth of incubators of the kind referred to, extreme difficulty has heretofore been experienced in uniformly and accurately maintaining the proper predetermined incubating temperature within them. This I have found due mostly to the disturbing influence of extraneous thermal conditions tending to chill the inflowing heating medium by upward ground conduction as—for example— when incubators are supported on stone and concrete, or on the damp earth floors of cellars, poultry houses, etc.

My present invention has for its chief object to obviate the disadvantage above pointed out, and is otherwise directed to structural improvements and refinements whereby this desired end may be attained.

With reference to the drawings herewith:

Fig. I is a front elevation of an incubator structure conveniently embodying my invention.

Fig. II is a longitudinal sectional view of the same.

Fig. III is a plan section taken as indicated by the arrows III—III in Fig. II; and, Fig. IV is a central cross section viewed in the direction of the arrows IV—IV in Figs. II and III.

As herein depicted, the casing 10 of the organization affords an incubating chamber 11, which, in the present instance, is appropriately proportioned to accommodate, side by side, two racks, such as shown at 12, 12 each capable of supporting a multiplicity of egg trays 13. In order to permit individual access to the tray racks 12, the casing 10 is equipped—at the front—with two pairs of double doors 14, 14 as best shown in Fig. I. The bottom 15 of the casing 10 is hollow and communicates with the incubating chamber 11 through grated openings, 16, 16 in the floor 17 of the latter, said openings being preferably disposed centrally with regard to the allocation of the tray racks 12.

The end walls 18 of the incubator are also made hollow as shown in Figs. II and III, to serve as passages via which fresh air is conducted into the incubating chamber 11 from opposite directions. The air enters the structure at the front through screened ports 19 which open into horizontal ducts 20 built in the end walls 18. The hollows of these end walls 18 are subdivided by partitions 21 into up-flow branches 22 and down-flow branches 23. The two branches 22, 23 communicate in each instance over the top of the corresponding partition 21; the up-flow branch 22 receiving the air through a slot 24 in the top wall of the duct 20, and the down-flow branch 23 discharging, through an opening 25 at the bottom, directly into the incubating chamber 11.

Exhaust of the air from the incubator is by way of a centrally-located flue 26 whereof the upper portion 27 is in the form of a vertical pipe that extends through the top of the casing 10, while the lower portion 28 is expanded—as shown in Fig. IV—to the full width of the incubating chamber 11. The lower portion 28 of the flue 26 is open into the hollow base 15 through an opening 29 in the floor 17 and, said opening, as well as the hollow base 15, are subdivided by a common medially located vertical baffle 30.

Heating is effected by vertical coil banks 31 in the up-flow air branches 22 of the hollow end walls 18, and a horizontal coil bank 32 in the hollow base 15, the terminals of these several coils being connected to supply and return mains 33, 34 for the heating medium, the supply main 33 extending longitudinally over the top of the casing 10, and the return main 34 through the hollow base 15— as shown in Fig. II. Draft in the flue 26 is promoted artificially by an auxiliary bank 35 of heating coils located in its bottom portion 28, said bank being also connected across the pipe mains 33, 34.

In operation, the fresh air entering the incubator through the grated inlets 19 and horizontal ducts 20, passes by way of the slots 24 into the up-flow branches 22 of the hollow end walls 18. In moving upward through the branch 22 in each instance, the air is thoroughly and uniformly warmed by the pipe coil 31, and then passes over the top of the partition 21 for descent in the down-flow branch 23, from whence it enters the incubating chamber 11 near the bottom through the opening 25. The two air streams thus passed from opposite ends into the incubating chamber 11, first rise to the top of the latter and are then deflected in a generally downward direction, as conventionally indicated by the arrows in Fig. II, through and about the egg trays 13 on the racks 12. In their further progress, the two air streams pass through the grated openings 16 in the floor 17 of the incubating chamber 11, and into the hollow base 15 wherein they move from opposed directions toward the flue 26, the medial baffle 30 serving to maintain them difinitely separated, while the auxiliary heating pipe coil 35 incidentally operates to accelerate exhaust through said flue and thereby to maintain the air circulation as described. It will thus be seen that by passing the warm air through the hollow base 15 after leaving the incubation chamber 11, and by relying upon the assistance of the horizontal coil bank 32, I am able to effectively counteract disturbing influences of external thermal conditions operating at that region from interfering with maintenance of the necessary uniform incubating temperature within.

Having thus described my invention, I claim:

1. An incubator of the type seating on the ground or floor level comprising an incubating chamber with up-and-down inlets at opposite ends for entry and divided flow of warm air into said chamber at its bottom, a chill-insulating base communicating by grated openings with said incubating chamber but separated from the inlets, and a flue centrally located to determine traverse of the divided air streams in opposed directions through the base to effectively heat said base to counteract directly-communicated upward temperature reducing influences previous to discharge from the incubator.

2. An incubator of the character described comprising an incubator chamber with up-and-down inlets at opposite ends for entry and divided flow of warm air into said chamber at its bottom, a hollow base communicating with said incubating chamber but isolated from the inlets, and a centrally located flue with a medial baffle to determine definite separation and traverse of the divided air streams in opposed directions through the hollow base to effectively heat said base and counteract upward chilling influences previous to discharge from the incubator.

3. An incubator of the character described comprising an incubating chamber with opposed up-and-down inlets for the entry of warm air thereinto at its bottom, a communicating hollow base isolated from the inlets, a coil bank in said base to initially heat it, and means for causing the warm air circulated through the incubating chamber to traverse and thereby serve as an auxiliary heating means for the hollow base to counteract upward chilling influences previous to discharge from the incubator.

4. An incubator of the character described comprising an incubating chamber with separately communicating hollow walls affording up-and-down inlets for conduction of air into said chamber at its bottom, a hollow base isolated from the said inlets, heating coils within the hollow walls, fresh air inlets opening into the walls, and an exhaust flue leading from the hollow base divided by a medial vertical baffle to determine induction of fresh air into the hollow walls for warming by the heating coils therein, circulation of the warm air within the incubating chamber, and final traverse through the hollow base to effectively heat said base in counteracting upward ground chill previous to discharge from the incubator.

5. An incubator of the character described comprising an incubating chamber with separately communicating hollow end walls affording up-and-down inlets for entry of air into the chamber at its bottom, a hollow base isolated from said air inlets, heating coils in the end walls and hollow base, fresh air inlets opening into and aligned below the upwardly directed passages of said end walls, and a centrally located exhaust flue leading from the hollow base with a medial vertical baffle to determine induction of fresh air through the hollow end walls for warming by the heating means therein, divided circulation of the warm air in the incubating chamber, and traverse of the divided air streams in opposed directions through the hollow base to serve as supplementary heating means for said base in counteracting upward subjacent chilling influences previous to discharge from the incubator.

In testimony whereof, I have hereunto signed my name at Trenton, N. J., this 16th day of May, 1925.

TOLBERT K. TIFFANY.